United States Patent
Sugiura et al.

(10) Patent No.: US 10,038,215 B2
(45) Date of Patent: Jul. 31, 2018

(54) METHOD FOR PRODUCING SULFIDE SOLID ELECTROLYTE

(71) Applicant: TOYOTA JIDOSHA KABUSHIKI KAISHA, Toyota-shi, Aichi-ken (JP)

(72) Inventors: Koichi Sugiura, Susono (JP); Miwako Ohashi, Mishima (JP); Masako Nita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 14/910,395

(22) PCT Filed: Sep. 3, 2014

(86) PCT No.: PCT/JP2014/073168
§ 371 (c)(1),
(2) Date: Feb. 5, 2016

(87) PCT Pub. No.: WO2015/037490
PCT Pub. Date: Mar. 19, 2015

(65) Prior Publication Data
US 2016/0190638 A1    Jun. 30, 2016

(30) Foreign Application Priority Data

Sep. 13, 2013 (JP) .................... 2013-190110

(51) Int. Cl.
*H01M 10/0562* (2010.01)
*H01M 10/052* (2010.01)
*H01M 10/0525* (2010.01)

(52) U.S. Cl.
CPC ..... *H01M 10/0562* (2013.01); *H01M 10/052* (2013.01); *H01M 10/0525* (2013.01);
(Continued)

(58) Field of Classification Search
CPC ........ H01M 10/0562; H01M 10/0525; H01M 10/052; H01M 2300/0068; H01M 2300/0065
See application file for complete search history.

(56) References Cited

U.S. PATENT DOCUMENTS

| | | | |
|---|---|---|---|
| 2007/0196739 A1 | 8/2007 | Seino et al. | |
| 2012/0009484 A1* | 1/2012 | Aburatani | ................ C03C 1/02 429/322 |
| 2014/0141339 A1 | 5/2014 | Sugiura et al. | |

FOREIGN PATENT DOCUMENTS

| | | |
|---|---|---|
| CN | 1941219 A | 4/2007 |
| JP | H07-330312 A | 12/1995 |

(Continued)

*Primary Examiner* — Lisa S Park
(74) *Attorney, Agent, or Firm* — Oliff PLC (57) ABSTRACT

A main object of the present invention is to provide a method for producing sulfide solid electrolytes, by which sulfide solid electrolytes whose productivity, recovery rate, and ionic conductivity are improved can be produced. The method of the present invention includes the steps of: pulverizing a mixture that is obtained by mixing a sulfide solid electrolyte containing sulfides and a single type of halides or a raw material thereof, an ether compound, and a solvent to obtain a pulverized product; and carrying out heating treatment wherein the obtained pulverized product is heated to obtain a crystallized sulfide solid electrolyte, wherein formulas "$0.44 \leq C/(A+B+C) \leq 0.70$" and "$0.10 \leq B/(A+B+C) \leq 0.36$" are satisfied, where "A [g]" denotes a weight of the sulfide solid electrolyte or the raw material thereof, "B [g]" denotes a weight of the ether compound, and "C [g]" denotes a weight of the solvent.

8 Claims, 8 Drawing Sheets (52) U.S. Cl.
 CPC ............... *H01M 2300/0065* (2013.01); *H01M 2300/0068* (2013.01)

(56) References Cited

FOREIGN PATENT DOCUMENTS

| | | |
|---|---|---|
| JP | 2013-020894 A | 1/2013 |
| WO | 2005/040039 A1 | 5/2005 |

* cited by examiner

METHOD FOR PRODUCING SULFIDE SOLID ELECTROLYTE

TECHNICAL FIELD

The present invention relates to a method for producing a sulfide solid electrolyte.

BACKGROUND ART

A metal ion secondary battery (for example, a lithium ion secondary battery, and also referred to as an "all-solid-state battery" in the following description) having a solid electrolyte layer obtained by using a nonflammable solid electrolyte has many advantages such as easiness to simplify a system for guaranteeing safety.

As a technique for such an all-solid-state battery, for example, Patent Literature 1 discloses a method for producing a sulfide solid electrolyte material including a microparticulation process in which an ether compound is added to a coarse-grained material of a sulfide solid electrolyte material, and the coarse-grained material is microparticulated through a pulverization treatment. In paragraph [0031] of Patent Literature 1, it is described that the coarse-grained material may contain an element X (where "X" denotes a halogen element). In addition, in paragraph [0027] of Patent Literature 1, it is described that the amount of the added ether compound may be set to, for example, 0.01 to 100 wt % with respect to the coarse-grained material. Furthermore, in paragraph [0044] of Patent Literature 1, it is described that a solvent may be added in addition to the ether compound, and the amount of the added solvent is not particularly limited. In Example of Patent Literature 1, it is described that a weight percentage of the solvent with respect to a total sum weight of the coarse-grained material, the ether compound, and the solvent is set to 78% or higher. Moreover, in paragraph [0050] of Patent Literature 1, it is described that a heat treatment process may be performed after the microparticulation process or after the drying process for removing the ether compound following the microparticulation process.

CITATION LIST

Patent Literature

Patent Literature 1: JP 2013-20894 A

SUMMARY OF INVENTION

Technical Problem

In Patent Literature 1, described is a method for producing crystallized sulfide solid electrolytes by baking sulfide solid electrolytes microparticulated through a pulverization treatment to be crystallized. Here, in order to obtain sulfide solid electrolytes having a high ion conductivity, it is effective to bake the sulfide solid electrolytes microparticulated through a pulverization treatment, to be crystallized. In addition, in order to improve productivity of the pulverization treatment and dispersiveness of sulfide solid electrolytes, it is necessary to use a dispersant for dispersing the sulfide solid electrolytes when the pulverization treatment is performed. However, the inventors found that, if a dispersant is used in the pulverization treatment for producing a sulfide solid electrolyte containing halides, the halides are dissolved to the dispersant, and it may be difficult to produce a sulfide solid electrolyte having a desired composition, and in some cases, it may be difficult to improve the ion conductivity of the sulfide solid electrolyte. If the dispersant is not used in the pulverization treatment in order to avoid such a case, productivity of the pulverization treatment is degraded, and microparticulation of sulfide solid electrolytes becomes difficult. Therefore, in order to produce microparticulated and dispersed sulfide solid electrolytes, it is necessary to use the dispersant up to a certain amount or more. In order to avoid the above case, it is necessary to use a proper amount of the dispersant.

There is no disclosure in Patent Literature 1 about a concept of properly controlling the amount of the dispersant. Therefore, in the technique disclosed in Patent Literature 1, it may be difficult to produce sulfide solid electrolytes by satisfying all of productivity, a recovery rate, and a high ion conductivity (where the "recovery rate" refers to a percentage of the recovered amount of the microparticulated sulfide solid electrolyte material against the amount of the pulverized material (coarse-grained material), and hereinafter this similarly applies to the entire specification).

Therefore, an object of the present invention is to provide a method for producing sulfide solid electrolytes, capable of improving productivity, a recovery rate, and an ion conductivity.

Solution to Problem

The inventors made diligent studies and found that it is necessary to control the amount of the dispersant used in the wet pulverization treatment within a predetermined range in order to produce sulfide solid electrolytes with the improved productivity, recovery rate, and ion conductivity. In addition, the inventors found that the amount of the dispersant to be used varies depending on a type of the halides contained in the sulfide solid electrolyte. Furthermore, the inventors found that the amount of the solvent applied along with the dispersant is within a predetermined range under all producing conditions where sulfide solid electrolytes can be produced with the improved productivity, recovery rate, and ion conductivity. Moreover, the inventors found that, if a raw material of the sulfide solid electrolyte contains any substance dissolvable to the dispersant (dispersant-dissolvable substance), the dispersant-dissolvable substance of the sulfide solid electrolytes synthesized during a mechanical milling process may be dissolved to the dispersant even when the synthesized sulfide solid electrolyte is naturally undissolvable to the dispersant by itself. This invention has been achieved on the basis of these findings.

In order to address the aforementioned problems, the present invention has the following measures. That is:

According to a first aspect of the present invention, there is provided a method for producing a sulfide solid electrolyte including the steps of: carrying out wet pulverization wherein a mixture of a sulfide solid electrolyte containing sulfides and a single type of halides or a raw material of the sulfide solid electrolyte, an ether compound, and a solvent is pulverized to obtain a pulverized product; and carrying out heat treatment wherein the obtained pulverized product is heated to obtain a crystallized sulfide solid electrolyte, wherein the following Formulas (1) and (2) are satisfied:

$$0.44 \leq C/(A+B+C) \leq 0.70 \qquad \text{Formula (1), and}$$

$$0.10 \leq B/(A+B+C) \leq 0.36 \qquad \text{Formula (2),}$$

where "A [g]" denotes a weight of the sulfide solid electrolyte or the raw material of the sulfide solid electrolyte, "B [g]" denotes a weight of the ether compound, and "C [g]" denotes a weight of the solvent.

If the Formula (1) is satisfied in production of the sulfide solid electrolyte containing sulfides and a single type of halides, it is possible to improve the recovery rate. In addition, if the condition "0.10≤B/(A+B+C)" is satisfied, it is possible to improve the productivity and the recovery rate. Furthermore, if the condition "B/(A+B+C)≤0.36" is satisfied, it is possible to produce the sulfide solid electrolyte with a high ion conductivity. Therefore, if the Formulas (1) and (2) are satisfied, it is possible to produce the sulfide solid electrolyte with the improved productivity, recovery rate, and ion conductivity.

In the first aspect of the present invention, it is preferable that a halogen of the single type of halides is selected from a group consisting of F, Cl, Br, and I. Such an embodiment facilitates production of the sulfide solid electrolyte with the improved ion conductivity.

According to a second aspect of the present invention, there is provided a method for producing a sulfide solid electrolyte including the steps of: carrying out wet pulverization wherein a mixture of a sulfide solid electrolyte containing sulfides and two types of halides or a raw material of the sulfide solid electrolyte, an ether compound, and a solvent is pulverized to obtain a pulverized product; and carrying out heat treatment wherein the obtained pulverized product heated to obtain a crystallized sulfide solid electrolyte, wherein the following Formulas (i) and (ii) are satisfied:

$$0.40 \leq Z/(X+Y+Z) \leq 0.795 \quad \text{Formula (i), and}$$

$$0.0050 \leq Y/(X+Y+Z) \leq 0.40 \quad \text{Formula (ii),}$$

where "X [g]" denotes a weight of the sulfide solid electrolyte or the raw material of the sulfide solid electrolyte, "Y [g]" denotes a weight of the ether compound, and "Z [g]" denotes a weight of the solvent.

If the Formula (i) is satisfied in production of the sulfide solid electrolyte containing sulfides and two types of halides, it is possible to improve the recovery rate. In addition, if the condition "0.0050≤Y/(X+Y+Z)" is satisfied, it is possible to improve the productivity and the recovery rate. Furthermore, if the condition "Y/(X+Y+Z)≤0.40" is satisfied, it is possible to produce the sulfide solid electrolyte with a high ion conductivity. Therefore, if the Formulas (i) and (ii) are satisfied, it is possible to produce the sulfide solid electrolyte with the improved productivity, recovery rate, and ion conductivity.

In the second aspect of the present invention, it is preferable that halogens of the two types of halides are selected from a group consisting of F, Cl, Br, and I. Such an embodiment facilitates production of the sulfide solid electrolyte with the improved ion conductivity.

In the first and second aspects of the present invention, it is preferable that the sulfides include Li, "A," and S, where "A" denotes at least an element selected from a group consisting of P, Si, Ge, Al, and B. Such an embodiment facilitates production of the sulfide solid electrolyte with the improved ion conductivity.

According to the present invention, it is possible to provide a method for producing sulfide solid electrolytes, by which the sulfide solid electrolytes can be produced with the improved productivity, recovery rate, and ion conductivity.

DESCRIPTION OF EMBODIMENTS

A description will now be made for the present invention with reference to the accompanying drawings. It is noted that the embodiments described below are just for illustrative purposes, and are not intended to limit the scope of the invention.

The method for producing sulfide solid electrolytes according to the present invention is characterized in that, when the microparticulated sulfide solid electrolytes are produced through a wet pulverization process for sulfide solid electrolytes or a raw material thereof, a predetermined condition is satisfied for a weight relationship between sulfide solid electrolytes or a raw material thereof "A [g]," an ether compound "B [g]," and a solvent "C [g]." According to the present invention, the aforementioned condition is established depending on the type of the halide contained in the sulfide solid electrolytes to be produced.

1. First Embodiment

Figure 1:
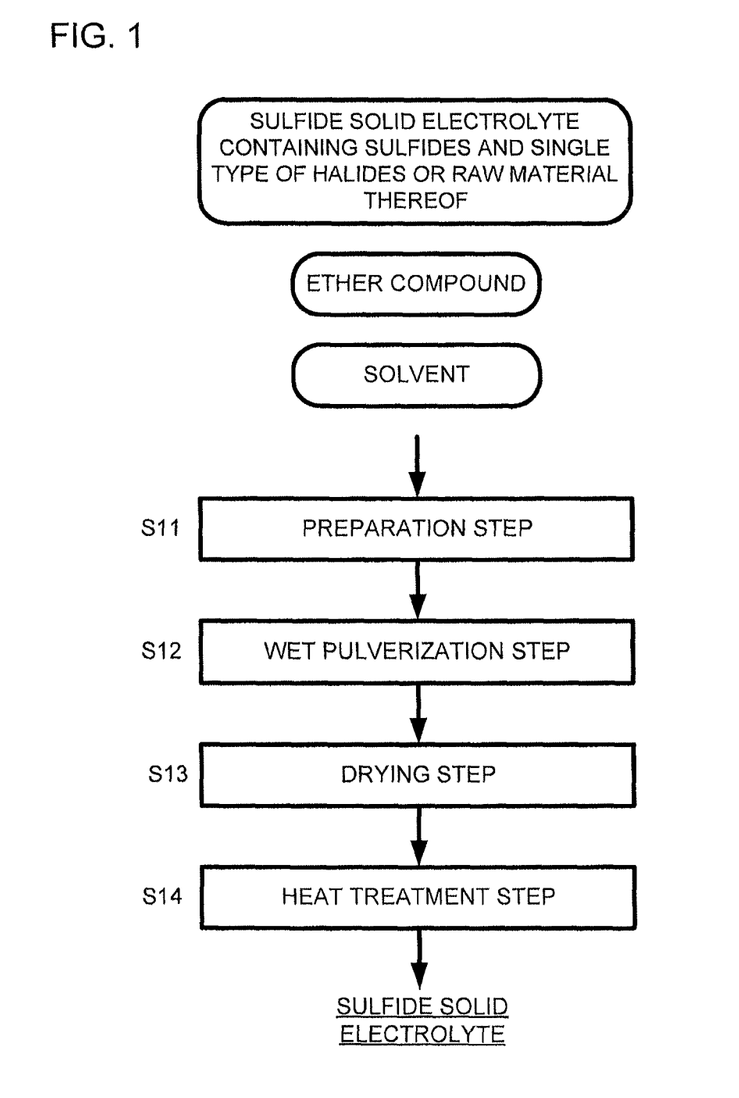
FIG. 1 is a flowchart illustrating a method for producing sulfide solid electrolytes according to a first embodiment of the present invention.

FIG. 1 is a flowchart illustrating an exemplary method for producing sulfide solid electrolytes according to a first embodiment of the present invention. The first embodiment of the present invention relates to a method of producing sulfide solid electrolytes containing sulfides and a single type of halides. As illustrated in FIG. 1, according to the first embodiment of the present invention, the method includes a preparation step (S11), a wet pulverization step (S12), a drying step (S13), and a heat treatment step (S14).

1.1. Preparation Step (S11)

In the preparation step (hereinafter, also referred to as "S11"), a mixture is prepared by mixing a sulfide solid electrolyte containing sulfides and a single type of halides or a raw material thereof (for example, LiI—Li$_2$S—P$_2$S$_5$ glass), an ether compound (for example, butyl ether), and a solvent (for example, dehydrated heptane). In step S11, the mixture is prepared by satisfying Formulas (1) and (2) regarding a weight relationship between the sulfide solid electrolyte containing sulfides and a single type of halides or a raw material thereof, the ether compound, and the solvent as described below:

$$0.44 \leq C/(A+B+C) \leq 0.70 \quad \text{Formula (1), and}$$

$$0.10 \leq B/(A+B+C) \leq 0.36 \quad \text{Formula (2),}$$

where "A [g]" denotes a weight of the sulfide solid electrolyte or the raw material thereof containing sulfides and a single type of halides, "B [g]" denotes a weight of the ether compound, and "C [g]" denotes a weight of the solvent.

1.2. Wet Pulverization Step (S12)

In a wet pulverization step (hereinafter, also referred to as "S12"), the mixture prepared in S11 is charged to a predetermined pot (for example, zirconia pot), and a predetermined type of balls (for example, zirconia balls) are inserted. Then, the pot is encapsulated. Then, the pot is installed in a planetary ball mill machine, and mechanical milling (wet type) is performed under predetermined conditions, so that microparticulated sulfide solid electrolytes are obtained.

1.3 Drying Step (S13)

In the drying step (hereinafter, also referred to as "S13"), after S12, the microparticulated sulfide solid electrolyte is dried to remove the ether compound and the solvent. The drying temperature of S13 is not particularly limited. For example, the drying is performed at a temperature lower than a crystallization temperature.

1.4. Heat Treatment Step (S14)

In the heat treatment step (hereinafter, also referred to as "S14"), after S13, the microparticulated sulfide solid electrolyte is heated up to a crystallization temperature or higher to obtain a crystallized sulfide solid electrolyte. The heat treatment temperature of S14 is not particularly limited as long as it is equal to or higher than the crystallization temperature. Preferably, the heat treatment temperature is adjusted such that a crystalline phase having a high ion conductivity is produced (any unnecessary crystalline phase is not produced). This similarly applies to the heat treatment time.

According to the first embodiment of the present invention, a weight relationship between the sulfide solid electrolyte containing sulfides and a single type of halides or a raw material thereof, the ether compound, and the solvent satisfies the aforementioned Formulas (1) and (2). If the Formula (1) is satisfied, it is possible to improve a recovery rate of the sulfide solid electrolyte. In addition, in the Formula (2), if the relationship "$0.10 \leq B/(A+B+C)$" is satisfied, it is possible to improve the productivity and the recovery rate of the sulfide solid electrolyte. Furthermore, in the Formula (2), if the relationship "$B/(A+B+C) \leq 0.36$" is satisfied, it is possible to avoid the halides from being excessively dissolved to the ether compound. Therefore, it is possible to produce the sulfide solid electrolyte with a high ion conductivity. Therefore, according to the first embodiment of the present invention, through S11 to S14, it is possible to provide a method for producing sulfide solid electrolytes, by which the sulfide solid electrolytes can be produced with the improved productivity, recovery rate, and ion conductivity.

According to the first embodiment of the present invention, from the viewpoints of improving the productivity, the recovery rate, and the ion conductivity and facilitating production of the sulfide solid electrolyte, it is preferable that a formula "$0.05 \leq A/(A+B+C) \leq 0.5$" be satisfied in addition to the aforementioned Formulas (1) and (2). From the same viewpoint, it is more preferable that a formula "$0.1 \leq A/(A+B+C) \leq 0.3$" be satisfied in addition to the aforementioned Formulas (1) and (2).

(1) Sulfide Solid Electrolyte Containing Sulfides and Single Type of Halides

When the sulfide solid electrolyte containing sulfides and a single type of halides is used in the preparation step, the sulfide solid electrolyte is a material not subjected to microparticulation (hereinafter, also referred to as a pre-microparticulation solid electrolyte). More specifically, the sulfide solid electrolyte is a material that contains sulfides and a single type of halides with an ion conductivity, and is not subjected to microparticulation. The sulfides contained in the pre-microparticulation solid electrolyte are preferably formed of Li, "A," or S (where "A" denotes at least an element selected from a group consisting of P, Si, Ge, Al, and B). This is because it is possible to obtain a pre-microparticulation solid electrolyte having an excellent lithium ion conductivity. In addition, the halogens of the single type of halides contained in the pre-microparticulation solid electrolyte are preferably selected from a group consisting of F, Cl, Br, and I. This is because it is possible to obtain a pre-microparticulation solid electrolyte having an excellent lithium ion conductivity. The single type of halides is preferably lithium halides (such as LiF, LiCl, LiBr, and LiI).

In the pre-microparticulation solid electrolyte, a total content of Li, "A," and S contained in the pre-microparticulation solid electrolyte is preferably set to 70 mol % or more. In addition, if the pre-microparticulation solid electrolyte contains sulfides of Li, "A," and S and a single type of lithium halides, the amount of the lithium halides contained in the pre-microparticulation solid electrolyte is preferably set to 1 mol % or more and 60 mol % or less, more preferably 5 mol % or more and 50 mol % or less, and most preferably 10 mol % or more and 30 mol % or less.

The pre-microparticulation solid electrolyte preferably contains an ion conductor having Li, "A," and S. In addition, the ion conductor preferably has an anionic structure having an ortho-composition such as $PS_4^{3-}$ structure, $SiS_4^{4-}$ structure, $GeS_4^{4-}$ structure, $AlS_3^{3-}$ structure, $BS_3^{3-}$ structure as a main structure as described below. This is because it is possible to obtain a pre-microparticulation solid electrolyte having high chemical stability. A ratio of the anionic structure having the ortho-composition with respect to the total anionic structure of the ion conductor is set to, preferably 60 mol % or more, more preferably 70 mol % or more, further preferably 80 mol % or more, and especially preferably 90 mol % or more. It is noted that the ratio of the anionic structure of the ortho-composition can be determined based on Raman spectrometry, nuclear magnetic resonance (NMR) spectroscopy, X-ray photoelectron spectroscopy (XPS), and the like.

The pre-microparticulation solid electrolyte is preferably produced by using a raw material composition containing $Li_2S$, sulfides of "A," and a single type of halides. This raw material composition will be described below in Section (2) "Raw Material of Sulfide Solid Electrolyte Containing Sulfides and Single Type of Halides."

Preferably, the pre-microparticulation solid electrolyte does not substantially contain $Li_2S$. This is because it is possible to obtain a pre-microparticulation solid electrolyte having a little amount of the generated hydrogen sulfides. The hydrogen sulfides are generated when $Li_2S$ reacts with water. For example, if the proportion of $Li_2S$ contained in the raw material composition is large, $Li_2S$ easily remains. The fact "the pre-microparticulation solid electrolyte does not substantially contain $Li_2S$" can be recognized through X-ray diffraction spectroscopy. Specifically, if the X-ray diffraction spectrum does not have a peak of $Li_2S$ ($2\theta=27.0°$, $31.2°$, $44.8°$, or $53.1°$), it can be determined that $Li_2S$ is substantially not contained.

Preferably, the pre-microparticulation solid electrolyte does not substantially contain crosslinking sulfur. This is because it is possible to obtain a pre-microparticulation solid electrolyte having a little amount of the generated hydrogen sulfides. Here, the "crosslinking sulfur" refers to crosslinking sulfur of the compound obtained through reaction between Li$_2$S and sulfides of "A." For example, crosslinking sulfur having a S$_3$P—S—PS$_3$ structure in a compound formed through reaction of Li$_2$S and P$_2$S$_5$ may be included. Such crosslinking sulfur easily reacts with water and easily generates hydrogen sulfides. In addition, the fact "the pre-microparticulation solid electrolyte does not substantially contain crosslinking sulfur" can be recognized through Raman spectroscopy measurement. For example, if the pre-microparticulation solid electrolyte is a Li$_2$S—P$_2$S$_5$-based material, a peak of the S$_3$P—S—PS$_3$ structure is exhibited typically at 402 cm$^{-1}$, Therefore, it is preferable that the peak is not detected. In addition, a peak of the PS$_4^{3-}$ structure is exhibited typically at 417 cm$^{-1}$. According to the present invention, an intensity I$_{402}$ at 402 cm$^{-1}$ is preferably smaller than an intensity I$_{417}$ at 417 cm$^{-1}$. More specifically, the intensity I$_{402}$ is set to, for example, preferably 70% or less, more preferably 50% or less, and further preferably 35% or less with respect to the intensity I$_{417}$. Similarly, even when the pre-microparticulation solid electrolyte is formed of materials other than the Li$_2$S—P$_2$S$_5$ system, the fact "the pre-microparticulation solid electrolyte does not substantially contain the crosslinking sulfur" can be determined by specifying a unit containing the crosslinking sulfur and measuring a peak of the unit.

When the pre-microparticulation solid electrolyte does not substantially contain Li$_2$S and the crosslinking sulfur, it typically has an ortho-composition or a composition similar to the ortho-composition. Here, a prefix "ortho" refers to an oxoacid having a highest hydration degree out of oxoacids obtained by hydrating the same oxide. According to the present invention, the ortho composition refers to a crystal composition of a sulfide with Li$_2$S most attached. For example, in a Li$_2$S—P$_2$S$_5$ system, Li$_3$PS$_4$ corresponds to the ortho composition. In a Li$_2$S—Al$_2$S$_3$ system, Li$_3$AlS$_3$ corresponds to the ortho composition. In a Li$_2$S—B$_2$S$_3$ system, Li$_3$BS$_3$ corresponds to the ortho composition. In a Li$_2$S—SiS$_2$ system, Li$_4$SiS$_4$ corresponds to the ortho composition. In a Li$_2$S—GeS$_2$ system, Li$_4$GeS$_4$ corresponds to the ortho composition.

For example, if the pre-microparticulation solid electrolyte contains the Li$_2$S—P$_2$S$_5$-based material, the ratio between Li$_2$S and P$_2$S$_5$ for obtaining the ortho composition is set to "Li$_2$S:P$_2$S$_5$=75:25" by mole. This similarly applies to a case where the pre-microparticulation solid electrolyte contains a Li$_2$S—Al$_2$S$_3$-based material. Meanwhile, if the pre-microparticulation solid electrolyte contains the Li$_2$S—SiS$_2$-based material, the ratio between Li$_2$S and SiS$_2$ for obtaining the ortho composition is set to "Li$_2$S:SiS$_2$=66.7:33.3" by mole. This similarly applies to a case where the pre-microparticulation solid electrolyte contains a Li$_2$S—GeS$_2$-based material.

The pre-microparticulation solid electrolyte may be, for example, particulate. An average particle diameter D$_{50}$ of the pre-microparticulation solid electrolyte is set to, for example, preferably 5 to 200 µm, and more preferably 10 to 100 µm. It is noted that the aforementioned average particle diameter may be determined, for example, by using a particle size analyzer.

The pre-microparticulation solid electrolyte may be, for example, sulfide glass. It is noted that the sulfide glass can be obtained, for example, by performing mechanical milling (such as a ball mill) for the raw material composition. When the pre-microparticulation solid electrolyte is produced by performing mechanical milling, its producing conditions are not particularly limited. For example, the ball may be formed of zirconia, alumina, agate, stainless steel (SUS), glass, or the like, a ball diameter (φ) may be set to 1 to 10 mm, and a processing time may be set to 10 to 100 hours. In addition, when a solvent is used in the mechanical milling, alkanes such as hexane, heptane, octane, nonane, and decane, aromatic hydrocarbons such as benzene, toluene, and xylene, cyclic hydrocarbons such as cyclohexane may be used. For drying after the mechanical milling, devices known in the art, such as a hot plate and a drying furnace, may be used.

If the pre-microparticulation solid electrolyte is formed of sulfide glass, particularly, a soft material can be obtained. Therefore, advantageously, it is possible to facilitate granulation of the sulfide solid electrolyte during pulverization and prevent the sulfide solid electrolyte from being easily attached to media. In addition, if the pre-microparticulation solid electrolyte is formed of sulfide glass, it may be difficult to apply large energy to the pre-microparticulation solid electrolyte in some cases. For example, when the sulfide glass becomes a glass ceramic due to heat of the applied energy, and the ion conductivity is degraded, it is impossible to apply large energy to the pre-microparticulation solid electrolyte. In this case, since an upper limit of the energy applied for microparticulation is restricted, it is necessary to perform microparticulation with smaller energy. However, by using the ether compound, it is possible to obtain a microparticulated sulfide solid electrolyte without applying excessively high energy.

(2) Raw Material of Sulfide Solid Electrolyte Containing Sulfides and Single Type of Halides If a raw material of the sulfide solid electrolyte containing sulfides and a single type of halides is used in the preparation step, the raw material composition for producing the "sulfide solid electrolyte containing sulfides and single type of halides" described above is used as a raw material. Such a raw material composition preferably includes, for example, a raw material containing Li$_2$S, sulfides of "A," and halides (such as a lithium halide).

The constituent Li$_2$S contained in the raw material composition preferably has less impurity. This is because it is possible to suppress a side reaction. As a method for synthesizing Li$_2$S, for example, a method described in Japanese Patent Application Publication No. H7-330312 may be employed. In addition, the constituent Li$_2$S is preferably purified using a method described in International Patent Application Publication No. WO2005/040039. The sulfides of "A" contained in the raw material composition may include, for example, P$_2$S$_3$, P$_2$S$_5$, SiS$_2$, GeS$_2$, Al$_2$S$_3$, B$_2$S$_3$, and the like.

The halides contained in the raw material composition may include a fluorine-containing compound, a chlorine-containing compound, a bromine-containing compound, an iodine-containing compound, and the like. Any compound containing fluorine such as LiF and LiPF$_6$ may be employed as the fluorine-containing compound without a particular limitation. Similarly, any compound containing chlorine such as LiCl may be employed as the chlorine-containing compound without a particular limitation. Similarly, any compound containing bromine such as LiBr may be employed as the bromine-containing compound without a particular limitation. Similarly, any compound containing iodine such as LiI may be employed as the iodine-containing compound without a particular limitation.

When the raw material composition contains Li$_2$S and P$_2$S$_5$, the proportion of Li$_2$S out of a total sum of Li$_2$S and P$_2$S$_5$ is set to preferably 70 to 80 mol %, more preferably 72 to 78 mol %, and further preferably 74 to 76 mol %. It is noted that this similarly applies to a case where the raw material composition contains $Li_2S$ and $Al_2S_3$, or a case where the raw material composition contains $Li_2S$ and $B_2S_3$. Meanwhile, when the raw material composition contains $Li_2S$ and $SiS_2$, the proportion of $Li_2S$ out of a total sum of $Li_2S$ and $SiS_2$ is set to preferably 62.5 to 70.9 mol %, more preferably 63 to 70 mol %, and further preferably 64 to 68 mol %. It is noted that this similarly applies to a case where the raw material composition contains $Li_2S$ and $GeS_2$.

(3) Ether Compound

According to the present invention, the ether compound is not particularly limited as long as it has an ether group (C—O—C). Out of them, an ether compound having two hydrocarbon groups bonded to an oxygen element is preferably employed. This is because the ether compound has a low reactivity with the pre-microparticulation solid electrolyte. In addition, the number of carbons in each hydrocarbon group is preferably set to 10 or less. This is because, when the number of carbons is too large, there is a possibility that the ether compound is difficult to be removed by drying.

The hydrocarbon group may be in the form of either a chain or a ring. For example, the hydrocarbon group may include: alkyl groups such as a methyl group, an ethyl group, a propyl group, an isopropyl group, and a butyl group; cycloalkyl groups such as a cyclopentyl group and a cyclohexyl group; aromatic hydrocarbon groups such as a phenyl group and a benzyl group, and the like. Specifically, the ether compound may include dimethyl ether, methyl ethyl ether, dipropyl ether, butyl ether, cyclopentyl methyl ether, and anisole. A molecular weight of the ether compound is set to, preferably 46 to 278, and more preferably 74 to 186.

(4) Solvent

According to the present invention, wet pulverization is performed with a solvent. Therefore, it is possible to prevent granulation of the sulfide solid electrolyte during pulverization and adhesion of the sulfide solid electrolyte to the media. For example, the solvent may include alkanes such as hexane, heptane, octane, nonane, and decane, aromatic hydrocarbons such as benzene, toluene and xylene, cyclic hydrocarbons such as cyclohexane, and the like. According to the present invention, the solvent preferably has a small water content. As a result, it is possible to suppress generation of hydrogen sulfides (deterioration of the sulfide solid electrolyte).

(5) Pulverization

According to the present invention, any type of pulverization may be employed without a particular limitation as long as the pre-microparticulation solid electrolyte can be microparticulated to a desired size. For example, the pulverization treatment may include media type pulverization such as a beads mill and a planetary ball mill, jet pulverization, cavitation pulverization, and the like. The pulverization conditions are determined so as to pulverize the pre-microparticulation solid electrolyte to a desired particle size. For example, when a planetary ball mill is employed, a sulfide solid electrolyte containing sulfides and a single type of halides or a raw material thereof, an ether compound, a solvent, and pulverization balls (media) are added, and a pulverization treatment is performed at a predetermined rotation number for a predetermined time. The pulverization balls may be formed of any material without a particular limitation as long as they do not react with the sulfide solid electrolytes. For example, the pulverization balls may be formed of zirconia, alumina, agate, stainless steel (SUS), glass, and the like. In addition, the pulverization balls may have a diameter ($\varphi$) of, for example, preferably 0.05 to 5 mm, and more preferably, 0.1 to 1 mm, but not limited thereto. If the diameter of the ball is too small, it may be difficult to handle the pulverization balls, and they may cause contamination. If the diameter of the ball is too large, it may be difficult to pulverize the sulfide solid electrolyte to a desired particle size. In addition, a rotational speed of a planetary disk for the planetary ball mill is set to preferably 100 to 500 rpm, and more preferably 150 to 250 rpm. Furthermore, a processing time for the planetary ball mill is set to, for example, preferably 1 to 100 hours.

Meanwhile, when the cavitation pulverization is employed, a rotation number is set to, for example, preferably 1000 to 3000 rpm. A flow rate is set to, for example, preferably 1.0 to 3.0 g/min.

According to the present invention, an ether compound is used in pulverization of solid electrolytes, Therefore, the ether compound can serve as a dispersant of the pre-microparticulation solid electrolytes. As a result, it is possible to prevent adhesion and granulation of the pre-microparticulation solid electrolytes. Therefore, according to the present invention, it is possible to obtain microparticulated sulfide solid electrolytes with a high recovery rate. The recovery rate of the sulfide solid electrolyte is set to, for example, preferably 90% or higher, and more preferably 95% or higher. It is noted that the recovery rate can be calculated based on a formula "(amount of recovered microparticulated sulfide solid electrolytes)/(amount of applied pre-microparticulation solid electrolytes)."

(6) Drying

According to the present invention, a drying step may be performed under any temperature or any time period without a particular limitation as long as the ether compound and the solvent can be removed through drying. The drying temperature may be set to be lower than a crystallization temperature of the sulfide solid electrolyte. The drying step may be performed by using known devices such as a hot plate or a drying furnace.

(7) Heat Treatment

According to the present invention, a temperature of the heat treatment step (heat treatment temperature) is not particularly limited as long as the sulfide solid electrolyte can be crystallized. The heat treatment temperature may be set to, for example, 130 to 250° C., preferably 160 to 220° C., and more preferably 170 to 210° C. The heat treatment may be performed by using a furnace known in the art.

An average particle diameter $D_{50}$ of the sulfide solid electrolytes obtained through the wet pulverization step is not particularly limited as long as it is smaller than that of the pre-microparticulation solid electrolytes. For example, the average particle diameter may be set to, for example, preferably 0.1 to 5 µm, and more preferably 0.5 to 4 µm. It is noted that the average particle diameter may be determined, for example, by using a particle size analyzer.

It is desirable that the sulfide solid electrolyte obtained through the heat treatment step preferably have the higher ionic conductivity. The ion conductivity of the sulfide solid electrolyte may be determined, for example, based on an AC impedance measurement method.

The sulfide solid electrolytes obtained according to the present invention may be employed in any field necessitating an ion conductivity, Out of them, the sulfide solid electrolytes obtained according to the present invention are preferably employed in an all-solid-state battery. In addition, the sulfide solid electrolytes obtained according to the present invention may be employed in a positive-electrode active material layer, a negative-electrode active material layer, or a solid electrolyte layer of an all-solid-state battery.

2. Second Embodiment

Figure 2:
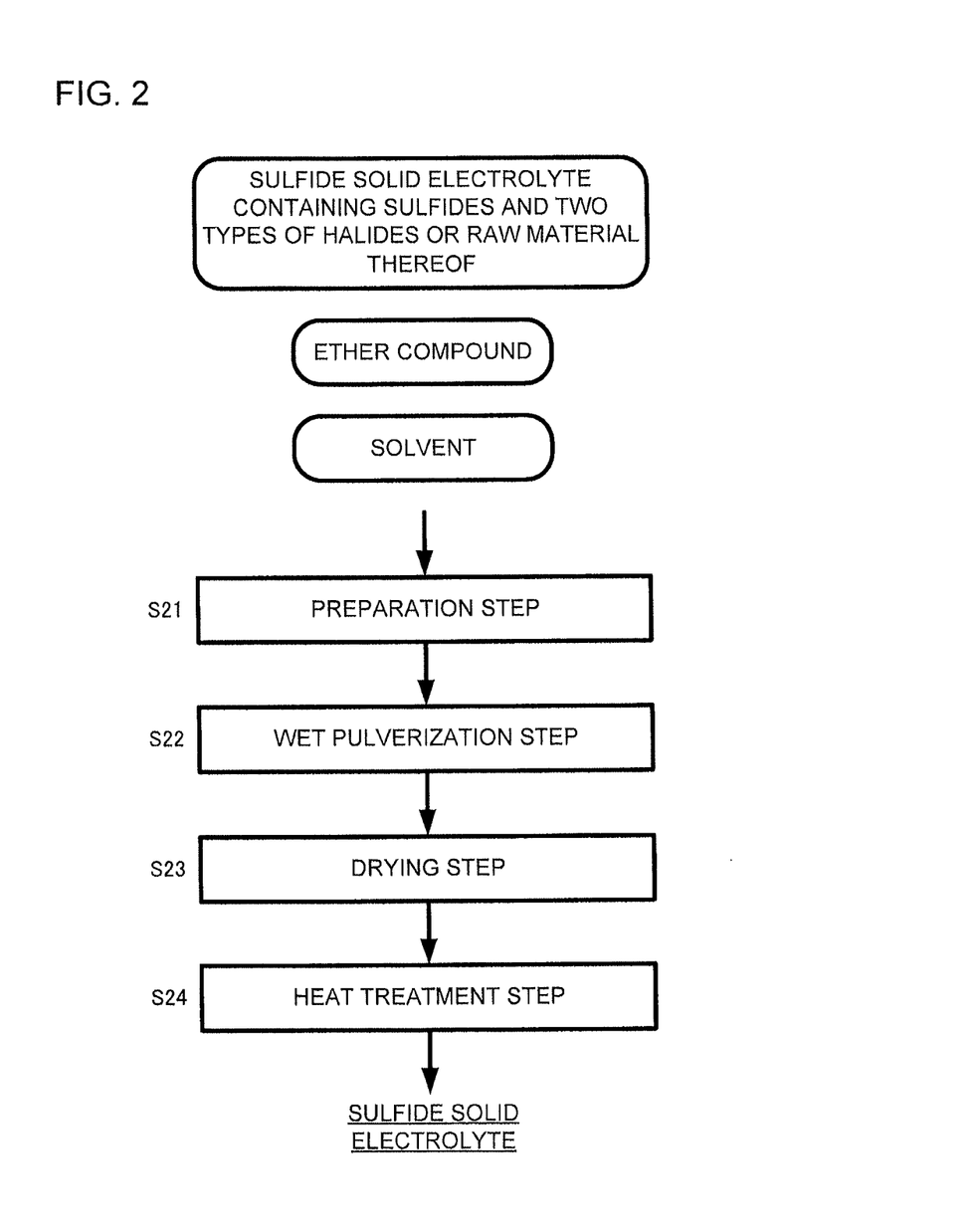
FIG. 2 is a flowchart illustrating a method for producing sulfide solid electrolytes according to a second embodiment of the present invention.

FIG. 2 is a flowchart illustrating an exemplary method for producing sulfide solid electrolytes according to a second embodiment of the present invention. The method according to the second embodiment of the present invention is employed in production of sulfide solid electrolytes containing sulfides and two types of halides. The method according to the second embodiment of the present invention includes a preparation step (S21), a wet pulverization step (S22), a drying step (S23), and a heat treatment step (S24) as illustrated in FIG. 2.

2.1. Preparation Step (S21)

In the preparation step (hereinafter, also referred to as "S21"), a mixture is prepared by mixing a sulfide solid electrolyte containing sulfides and two types of halides or a raw material thereof (for example, LiBr—LiI—Li$_2$S—P$_2$S$_5$ glass), an ether compound (for example, butyl ether), and a solvent (for example, dehydrated heptane). In S21, the mixture is prepared by using the sulfide solid electrolyte containing sulfides and two types of halides or the raw material thereof, the ether compound, and the solvent, of which weights are set to satisfy the following Formulas (i) and (ii):

$$0.40 \leq Z/(X+Y+Z) \leq 0.795 \quad \text{Formula (i), and}$$

$$0.0050 \leq Y/(X+Y+Z) \leq 0.40 \quad \text{Formula (ii),}$$

where "X [g]" denotes a weight of the sulfide solid electrolyte containing sulfides and two types of halides or a raw material thereof, "Y [g]" denotes a weight of the ether compound, and "Z [g]" denotes a weight of the solvent.

2.2. Wet Pulverization Step (S22)

In the wet pulverization step (hereinafter, also referred to as "S22"), the mixture prepared in S21 is charged to a predetermined pot (for example, a zirconia pot), predetermined balls (for example, zirconia balls) are further charged to the pot, and the pot is encapsulated. Then, this pot is installed in a planetary ball mill machine, and mechanical milling (wet mechanical milling) is performed under predetermined conditions, so that a microparticulated sulfide solid electrolyte is obtained. S22 is similar to S12 except that the mixture prepared in S21 is used instead of the mixture prepared in S11.

2.3. Drying Step (S23)

In the drying step (hereinafter, also referred to as "S23"), the ether compound and the solvent are removed by drying the microparticulated sulfide solid electrolyte after S22. S23 is similar to S13 except that the sulfide solid electrolyte microparticulated in S22 is dried instead of the sulfide solid electrolyte microparticulated in S12.

2.4. Heat Treatment Step (S24)

In the heat treatment step (hereinafter, also referred to as "S24"), a crystallized sulfide solid electrolyte is obtained by heating the microparticulated sulfide solid electrolyte over a crystallization temperature after S23. S24 is similar to S14 except that the microparticulated sulfide solid electrolyte obtained in S23 is subjected to the heat treatment instead of the microparticulated sulfide solid electrolyte obtained in S13.

According to the second embodiment of the present invention, a weight relationship between the sulfide solid electrolyte containing sulfides and two types of halides or the raw material thereof, the ether compound, and the solvent satisfies the aforementioned Formulas (i) and (ii). If the Formula (i) is satisfied, it is possible to improve the recovery rate of the sulfide solid electrolyte. In addition, the condition "0.0050≤Y/(X+Y+Z)" of the aforementioned Formula (ii) is satisfied, it is possible to improve the productivity and the recovery rate of the sulfide solid electrolyte. Furthermore, the condition "Y/(X+Y+Z)≤0.40" of the aforementioned Formula (ii) is satisfied, it is possible to avoid the halides from being excessively dissolved to the ether compound. Therefore, it is possible to produce sulfide solid electrolytes with a high ion conductivity. As a result, according to the second embodiment of the present invention, through S21 to S24, it is possible to provide a method for producing sulfide solid electrolytes with the improved productivity, recovery rate, and ion conductivity.

The second embodiment is similar to the first embodiment except that a single type of halides in the first embodiment is substituted with two types of halides, and the aforementioned Formulas (1) and (2) are substituted with the aforementioned Formulas (i) and (ii).

The halogens of the two types of halides contained in the pre-microparticulation solid electrolyte preferably include two elements selected from a group consisting of F, Cl, Br, and, I. As a result, it is possible to obtain a pre-microparticulation solid electrolyte having an excellent lithium ion conductivity. The two types of halides are preferably lithium halides (LiF, LiCl, LiBr, and LiI).

When the pre-microparticulation solid electrolyte contains sulfides formed of Li, "A," and S and two types of lithium halides, a total amount of the two types of lithium halides contained in the pre-microparticulation solid electrolyte is set to preferably 1 mol % or more and 60 mol % or less, more preferably 5 mol % or more and 50 mol % or less, and further preferably 10 mol % or more and 30 mol % or less. In addition, when the pre-microparticulation solid electrolyte is produced by performing mechanical milling, the ball diameter (φ) may be set to 0.05 to 5 mm, and preferably 0.1 to 1 mm.

According to the second embodiment of the present invention, in order to facilitate production of sulfide solid electrolytes with the improved productivity, recovery rate, and ion conductivity, a formula "0.05≤X/(X+Y+Z)≤0.5" is preferably satisfied in addition to the aforementioned Formulas (i) and (ii). From the same viewpoint, a formula "0.1≤X/(X+Y+Z)≤0.3" is more preferably satisfied in addition to the aforementioned Formulas (i) and (ii).

Other parts are similar to those of the method for producing sulfide solid electrolytes according to the first embodiment of the present invention. Therefore, they will not be described for simplicity purposes.

EXAMPLES

Production of Sample

Example 1

Production of Sulfide Solid Electrolyte Containing Single Halogen

As a starting material, lithium sulfide (Li$_2$S, produced by Furuuchi Chemical Co, Ltd., purity: 99.9%), phosphorus pentasulfide (P$_2$S$_5$, produced by Aldrich Co., LLC., purity: 99%), and lithium iodide (LiI, produced by NIPPOH CHEMICALS CO., LTD., purity: 99%) were employed. Then, in a glove box under an Ar atmosphere (having a dew point of −70° C.), the amounts of Li$_2$S and P$_2$S$_5$ were measured to have a mole ratio of "Li$_2$S:P$_2$S$_5$=75:25" (Li$_3$PS$_4$, ortho composition). Then, the amount of LiI was measured to have a ratio of 20 mol %, Then, the mixture of 2 g was charged to a vessel (45 ml, ZrO$_2$) of a planetary ball mill, dehydrated heptane (having a water content of 30 ppm or less, 4 g) and ZrO$_2$ balls (φ; 5 mm, 53 g) were further charged. Then, the vessel was perfectly encapsulated (under an Ar atmosphere). This vessel was installed in a planetary ball mill machine (model: P7, manufactured by FRITSCH GmbH), and mechanical milling was performed by 40 cycles with a processing time of 1 hour and an interval of 15 minutes by rotating the planetary disk at a rotation number of 500 rpm. Then, the resulting sample was dried on a hot plate at a temperature of 120° C. for 2 hours to remove heptane so as to obtain a sulfide solid electrolyte. A composition of the resulting sulfide solid electrolyte was "20LiI-80(0.75Li$_2$S-0.25P$_2$S$_5$)."

Preparation of Mixture

A coarse material of the resulting sulfide solid electrolyte of 2 g, an ether compound (butyl ether, 1 g), a solvent (dehydrated heptane, produced by KANTO CHEMICAL CO., INC., 7 g), and ZrO$_2$ balls (φ=0.6 mm, 40 g) were charged to a vessel (45 ml, formed of ZrO$_2$) of the planetary ball mill, and the vessel was perfectly encapsulated (under an Ar atmosphere).

Wet Pulverization

The vessel charged with the coarse material of the sulfide solid electrolyte, the ether compound, the solvent, and the ZrO$_2$ balls was installed in a planetary ball mill machine (model P7, produced by FRITSCH GmbH), and mechanical milling was performed at a revolution/rotation number of 200 rpm for 20 hours.

Drying

After completing the mechanical milling for 20 hours, the resulting sample was dried on a hot plate at a temperature of 120° C. for 2 hours to remove butyl ether and heptane. As a result, a sulfide solid electrolyte powder was obtained. Then, the amount of the resulting sulfide solid electrolyte powder was measured by using an electric balance to calculate a recovery rate.

Heat Treatment

The resulting sulfide solid electrolyte powder of 1 g was charged to an aluminum dish, and the dish was put on a hot plate. Then, a heat treatment (crystallization treatment) was performed at a temperature of 200° C. for 2 hours. As a result, a sulfide solid electrolyte of Example 1 was produced.

Example 2

Similar to Example 1, a sulfide solid electrolyte of Example 2 was produced. Compared to Example 1, an ether compound (butyl ether, 1.8 g), a solvent (dehydrated heptane, produced by KANTO CHEMICAL CO., INC., 6.2 g), and ZrO$_2$ balls (φ=1 mm, 40 g) were used in order to prepare the mixture in Example 2.

Example 3

Similar to Example 1, a sulfide solid electrolyte of Example 3 was produced. Compared to Example 1, an ether compound (butyl ether, 2.8 g) and a solvent (dehydrated heptane, produced by KANTO CHEMICAL CO., INC., 5.2 g) were used in order to prepare the mixture in Example 3.

Example 4

Similar to Example 1, a sulfide solid electrolyte of Example 4 was produced. Compared to Example 1, an ether compound (butyl ether, 3.6 g), a solvent (dehydrated heptane, produced by KANTO CHEMICAL CO., INC., 4.4 g), and ZrO$_2$ balls (φ=0.3 mm, 40 g) were used in order to prepare the mixture in Example 4.

Example 5

Production of Sulfide Solid Electrolyte Containing Two Halogens

As a starting material, lithium sulfide (Li$_2$S, produced by Furuuchi Chemical Co. Ltd., purity: 99.9%); phosphorus pentasulfide (P$_2$S$_5$, produced by Aldrich Co. LLC., purity: 99%), lithium iodide (LiI, produced by NIPPOH CHEMICALS CO., LTD., purity: 99%), and lithium bromide (LiBr, produced by KOJUNDO CHEMICAL LABORATORY CO., LTD.) were used. Then, in a glove box under an Ar atmosphere (having a dew point of −70° C.), the amounts of Li$_2$S and P$_2$S$_5$ were measured to have a mole ratio of "Li$_2$S:P$_2$S$_5$=75:25" (Li$_3$PS$_4$, ortho composition). Then, the amounts of LiI and LiBr were measured to have a ratio of 10 mol % and a ratio of 15 mol %, respectively. The mixture of 2 g was charged to a vessel (45 ml, formed of ZrO$_2$) of a planetary ball mill machine, and dehydrated heptane (having a water content of 30 ppm or less, 4 g) and ZrO$_2$ balls (φ: 5 mm, 53 g) were further charged. Then, the vessel was perfectly encapsulated (under an Ar atmosphere). This vessel was installed in a planetary ball mill machine (model: P7, manufactured by FRITSCH GmbH), and mechanical milling was performed by 40 cycles with a processing time of 1 hour and an interval of 15 minutes by rotating the planetary disk at a rotation number of 500 rpm. Then, the resulting sample was dried on a hot plate at a temperature of 120° C. for 2 hours to remove heptane so as to obtain a sulfide solid electrolyte. A composition of the resulting sulfide solid electrolyte was "15LiBr-10LiI-75 (0.75Li$_2$S-0.25P$_2$S$_5$)."

Preparation of Mixture

A coarse material of the resulting sulfide solid electrolyte of 2 g, an ether compound (butyl ether, 0.05 g), a solvent (dehydrated heptane, produced by KANTO CHEMICAL CO., INC., 7.95 g), and ZrO$_2$ balls (φ=1 mm, 40 g) were charged to a vessel (45 ml, formed of ZrO$_2$) of the planetary ball mill, and the vessel was perfectly encapsulated (under an Ar atmosphere).

Wet Pulverization

The vessel charged with the coarse material of the sulfide solid electrolyte, the ether compound, the solvent, and the ZrO$_2$ balls was installed in a planetary ball mill machine (model P7, produced by FRITSCH GmbH), and mechanical milling was performed at a revolution/rotation number of 200 rpm for 20 hours.

Drying

After completing the mechanical milling for 20 hours, the resulting sample was dried on a hot plate at a temperature of 120° C. for 2 hours to remove butyl ether and heptane. As a result, a sulfide solid electrolyte powder was obtained. Then, the amount of the resulting sulfide solid electrolyte powder was measured by using an electric balance to calculate a recovery rate.

Heat Treatment

The resulting sulfide solid electrolyte powder of 1 g was charged on an aluminum dish, and the dish was put on a hot plate. Then, a heat treatment (crystallization treatment) was performed at a temperature of 200° C. for 2 hours. As a result, a sulfide solid electrolyte of Example 5 was produced.

Example 6

Similar to Example 5, a sulfide solid electrolyte of Example 6 was produced. Compared to Example 5, an ether compound (butyl ether, 1 g), a solvent (dehydrated heptane, produced by KANTO CHEMICAL CO., INC., 7 g), and ZrO$_2$ balls (φ=0.6 mm, 40 g) were used in order to prepare the mixture in Example 6.

Example 7

Similar to Example 5, a sulfide solid electrolyte of Example 7 was produced. Compared to Example 5, an ether compound (butyl ether, 2 g), a solvent (dehydrated heptane, produced by KANTO CHEMICAL CO., INC., 6 g), and ZrO$_2$ balls (φ=0.3 mm, 40 g) were used in order to prepare the mixture in Example 7.

Example 8

Similar to Example 5, a sulfide solid electrolyte of Example 8 was produced. Compared to Example 5, an ether compound (butyl ether, 4 g) and a solvent (dehydrated heptane, produced by KANTO CHEMICAL CO., INC., 4 g) were used in order to prepare the mixture in Example 8.

Comparative Example 1

Similar to Example 1, a sulfide solid electrolyte of Comparative Example 1 was produced, Compared to Example 1, an ether compound (butyl ether, 0.5 g), a solvent (dehydrated heptane, produced by KANTO CHEMICAL CO., INC., 7.5 g), and ZrO$_2$ balls (φ=0.3 mm, 40 g) were used in order to prepare the mixture in Comparative Example 1.

Comparative Example 2

Similar to Example 1, a sulfide solid electrolyte of Comparative Example 2 was produced. Compared to Example 1, an ether compound (butyl ether, 4 g) and a solvent (dehydrated heptane, produced by KANTO CHEMICAL CO., INC., 4 g) were used in order to prepare the mixture in Comparative Example 2.

Comparative Example 3

Similar to Example 1, a sulfide solid electrolyte of Comparative Example 3 was produced. Compared to Example 1, an ether compound (butyl ether, 7 g), a solvent (dehydrated heptane, produced by KANTO CHEMICAL CO., INC., 1 g), and ZrO$_2$ balls (φ=1 mm, 40 g) were used in order to prepare the mixture in Comparative Example 3.

Comparative Example 4

Similar to Example 5, a sulfide solid electrolyte of Comparative Example 4 was produced. Compared to Example 5, an ether compound (butyl ether, 0.025 g), a solvent (dehydrated heptane, produced by KANTO CHEMICAL CO., INC., 7.975 g), and ZrO$_2$ balls (φ=0.6 mm, 40 g) were used in order to prepare the mixture in Comparative Example 4,

Comparative Example 5

Similar to Example 5, a sulfide solid electrolyte of Comparative Example 5 was produced. Compared to Example 5, an ether compound (butyl ether, 5 g) and a solvent (dehydrated heptane, produced by KANTO CHEMICAL CO., INC., 3 g) were used in order to prepare the mixture in Comparative Example 5.

Comparative Example 6

Similar to Example 5, a sulfide solid electrolyte of Comparative Example 6 was produced. Compared to Example 5, an ether compound (butyl ether, 7 g), a solvent (dehydrated heptane, produced by KANTO CHEMICAL CO., INC., 1 g), and ZrO$_2$ balls (φ=0.3 mm, 40 g) were used in order to prepare the mixture in Comparative Example 6.

Producing conditions of Examples 1 to 4 and Comparative Examples 1 to 3 are summarized in Table 1. In addition, producing conditions of Examples 5 to 8 and Comparative Examples 4 to 6 are summarized in Table 2,

TABLE 1

| | Halogen Type | Amount of Sulfide Solid Electrolyte A [g] | Amount of Ether Compound B [g] | Amount of Solvent C [g] | C/(A + B + C) | B/(A + B + C) |
|---|---|---|---|---|---|---|
| Example 1 | Single Type (LiI) | 2 | 1 | 7 | 0.70 | 0.10 |
| Example 2 | Single Type (LiI) | 2 | 1.8 | 6.2 | 0.62 | 0.18 |
| Example 3 | Single Type (LiI) | 2 | 2.8 | 5.2 | 0.52 | 0.28 |
| Example 4 | Single Type (LiI) | 2 | 3.6 | 4.4 | 0.44 | 0.36 |
| Comparative Example 1 | Single Type (LiI) | 2 | 0.5 | 7.5 | 0.75 | 0.050 |
| Comparative Example 2 | Single Type (LiI) | 2 | 4 | 4 | 0.40 | 0.40 |
| Comparative Example 3 | Single Type (LiI) | 2 | 7 | 1 | 0.10 | 0.70 |

TABLE 2

| | Halogen Type | Amount of Sulfide Solid Electrolyte X [g] | Amount of Ether Compound Y [g] | Amount of Solvent Z [g] | Z/(X + Y + Z) | Y/(X + Y + Z) |
|---|---|---|---|---|---|---|
| Example 5 | Two Types (LiBr, LiI) | 2 | 0.05 | 7.95 | 0.795 | 0.0050 |
| Example 6 | Two Types (LiBr, LiI) | 2 | 1 | 7 | 0.70 | 0.10 |
| Example 7 | Two Types (LiBr, LiI) | 2 | 2 | 6 | 0.60 | 0.20 |
| Example 8 | Two Types (LiBr, LiI) | 2 | 4 | 4 | 0.40 | 0.40 |
| Comparative Example 4 | Two Types (LiBr, LiI) | 2 | 0.025 | 7.975 | 0.7975 | 0.0030 |
| Comparative Example 5 | Two Types (LiBr, LiI) | 2 | 5 | 3 | 0.30 | 0.50 |
| Comparative Example 6 | Two Types (LiBr, LiI) | 2 | 7 | 1 | 0.10 | 0.70 |

[Grain Size Distribution Measurement]

A small amount of the sulfide solid electrolytes obtained from Examples 1 to 8 and Comparative Examples 1 to 6 were sampled, and an average particle diameter $D_{50}$ was determined by measuring grain size distributions by using a laser diffraction/scattering particle size analyzer (Model: MICROTRAC MT3300EXII, manufactured by NIKKISO CO., LTD.). The result thereof is shown in Table 3.

[X-Ray Diffraction Measurement]

For the sulfide solid electrolytes obtained from Examples 1 to 8 and Comparative Examples 1 to 6, an X-ray diffraction (XRD) measurement using CuKα rays was performed in order to analyze a compositional variation (which refers to a degree of variation in composition from a target production composition, hereinafter this similarly applies to the entire specification). In the XRD measurement, an X-ray diffractometer SmartLab produced by Rigaku Corporation was used. In the XRD measurement, the sample is disposed in a non-exposure chamber, and the XRD measurement was performed at a peak range ($2\theta=10°$ to $60°$) under an Ar-gas inert atmosphere. The compositional variation was recognized based on a formula "(intensity of crystallization peak of halogen contained in sulfide solid electrolytes)−(baseline position)", The results are shown in Table 3.

[Lithium Ion Conductivity Measurement]

For the sulfide solid electrolytes obtained from Examples 1 to 8 and Comparative Examples 1 to 6 (sulfide solid electrolytes subjected to the heat treatment), the lithium ion conductivity (room temperature) was measured based on an AC impedance measurement method. Specifically, a pellet having upper and lower areas of 1 cm² and a thickness of 0.5 mm was manufactured by using the resulting sulfide solid electrolytes. Then, the sample was molded by applying a pressure of 421.4 MPa to the pellet. The impedance was measured while the molded sample was bound at a torque of 6 N·cm. In the measurement, SOLARTRON 1260 was used, and the measurement conditions were set such that a voltage of 5 mV is applied, and a measurement frequency range is set to 0.01 to 1 MHz. The results are shown in Table 3.

[Result]

When Sulfide Solid Electrolyte Contains Single Halogen

Figure 3:
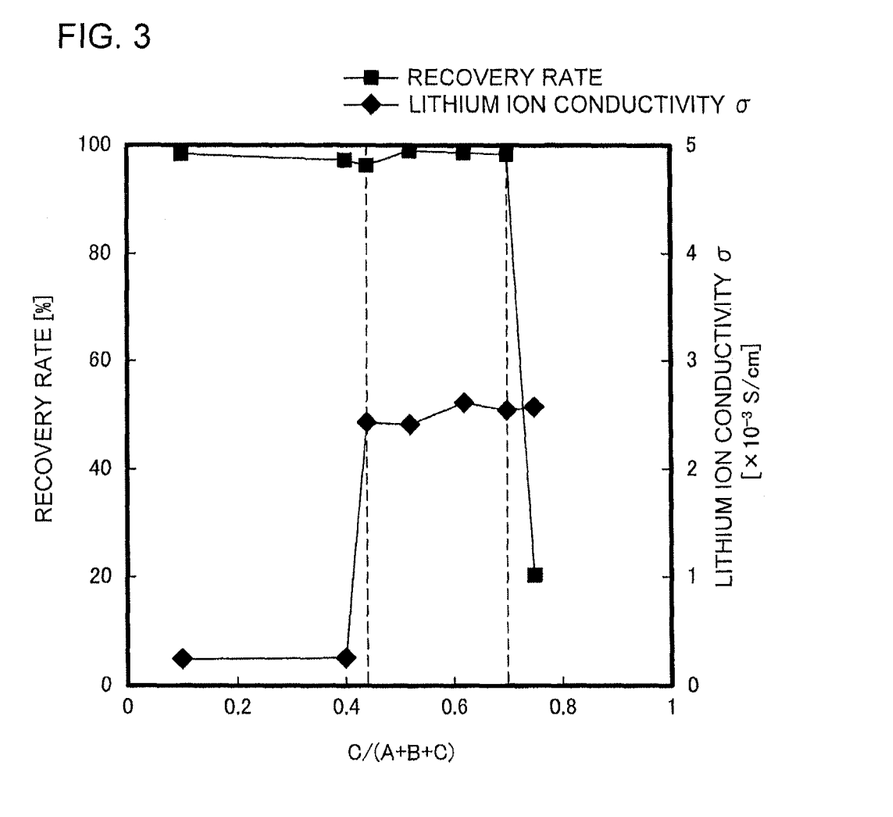
FIG. 3 is a diagram illustrating a relationship between a recovery rate, a lithium ion conductivity, and a proportion "C/(A+B+C)" when a single type of halides is contained.
Figure 4:
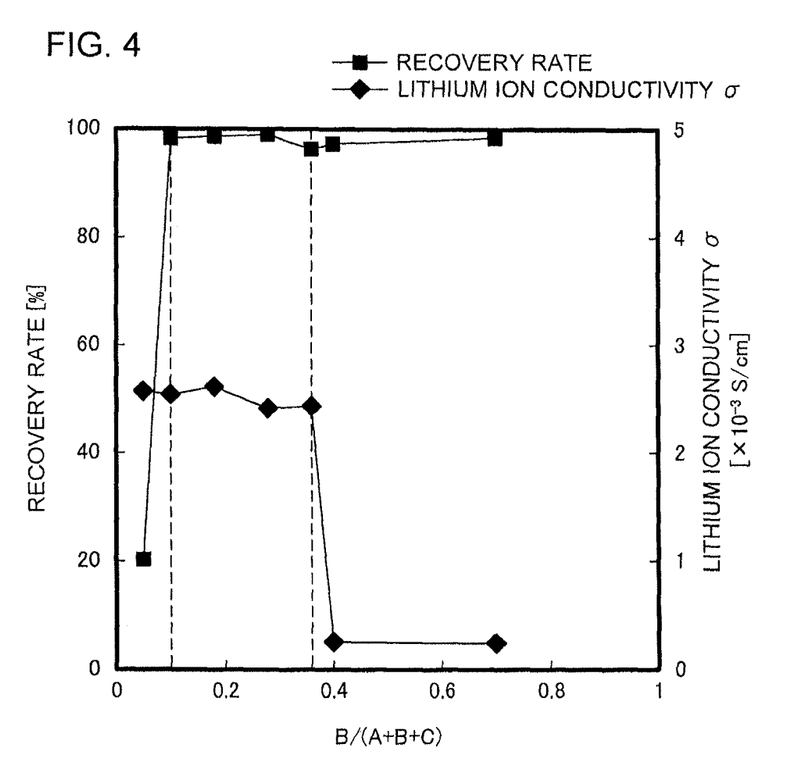
FIG. 4 is a diagram illustrating a relationship between a recovery rate, a lithium ion conductivity, and a proportion "B/(A+B+C)" when a single type of halides is contained.
Figure 5:
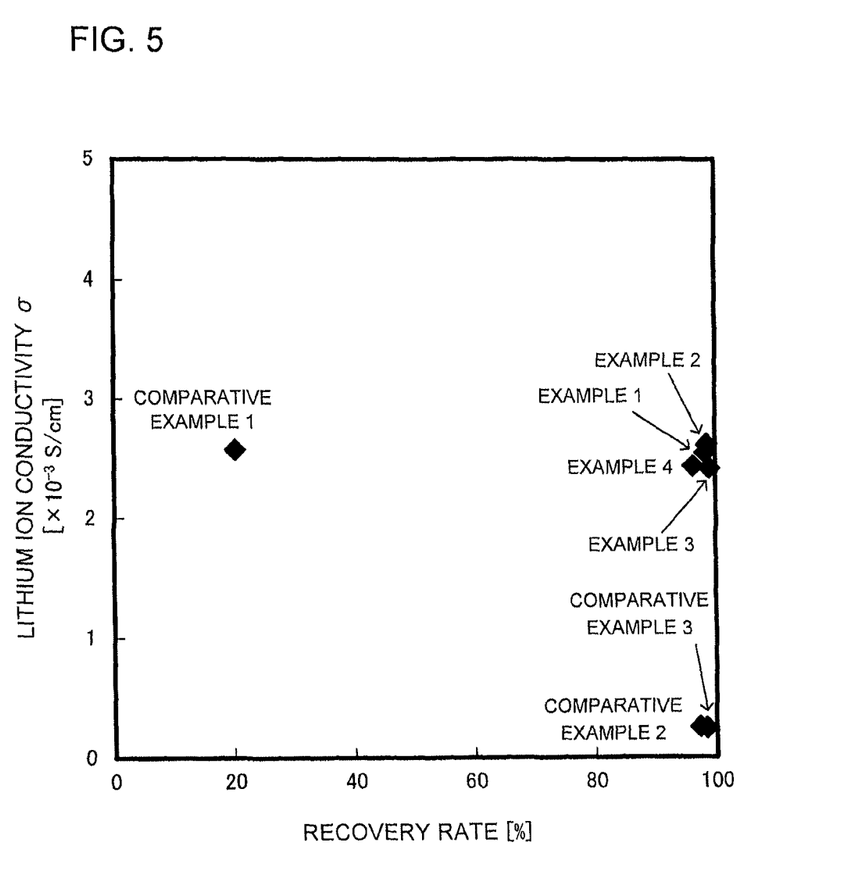
FIG. 5 is a diagram illustrating a relationship between the lithium ion conductivity and the recovery rate when a single type of halides is contained.

For Examples 1 to 4 and Comparative Examples 1 to 3, a relationship between the recovery rate, the lithium ion conductivity, and the proportion "C/(A+B+C)" of Table 1 is shown in FIG. 3, a relationship between the recovery rate, the lithium ion conductivity, and the proportion "B/(A+B+C)" of Table 1 is shown in FIG. 4, and a relationship between the lithium ion conductivity and the recovery rate is shown in FIG. 5. In FIG. 3, the dotted lines plot "C/(A+B+C)=0.44" and "C/(A+B+C)=0.70," In FIG. 4, the dotted lines plot "B/(A+B+C)=0.10" and "B/(A+B+C)=0.36."

As shown in Table 1 and FIGS. 3 to 5, it was recognized that the sulfide solid electrolytes of Examples 1 to 4 produced by using the method for producing sulfide solid electrolytes according to the present invention and satisfying the aforementioned formulas (1) and (2) have high recovery rates and high lithium ion conductivities. In addition, in Examples 1 to 4, the compositional variations were insignificant, and the productivities of the sulfide solid electrolytes were high. In comparison, in the case of the sulfide solid electrolyte of Comparative Example 1 that does not satisfy the aforementioned formulas (1) and (2), the lithium ion conductivity and the compositional variation were close to those of Examples 1 to 4, but the recovery rate was remarkably low. In the case of the sulfide solid electrolytes of Comparative Examples 2 and 3 that does not satisfy the aforementioned formula (2), the recovery rate was close to those of Examples 1 to 4, but the compositional variation was significant, and the lithium ion conductivity was remarkably low.

Accordingly, using the method for producing sulfide solid electrolytes according to the present invention and satisfying the aforementioned formulas (1) and (2), it was possible to produce sulfide solid electrolytes with the improved productivity, recovery rate, and ion conductivity.

When Sulfide Solid Electrolyte Contains Two Halogens

Figure 6:
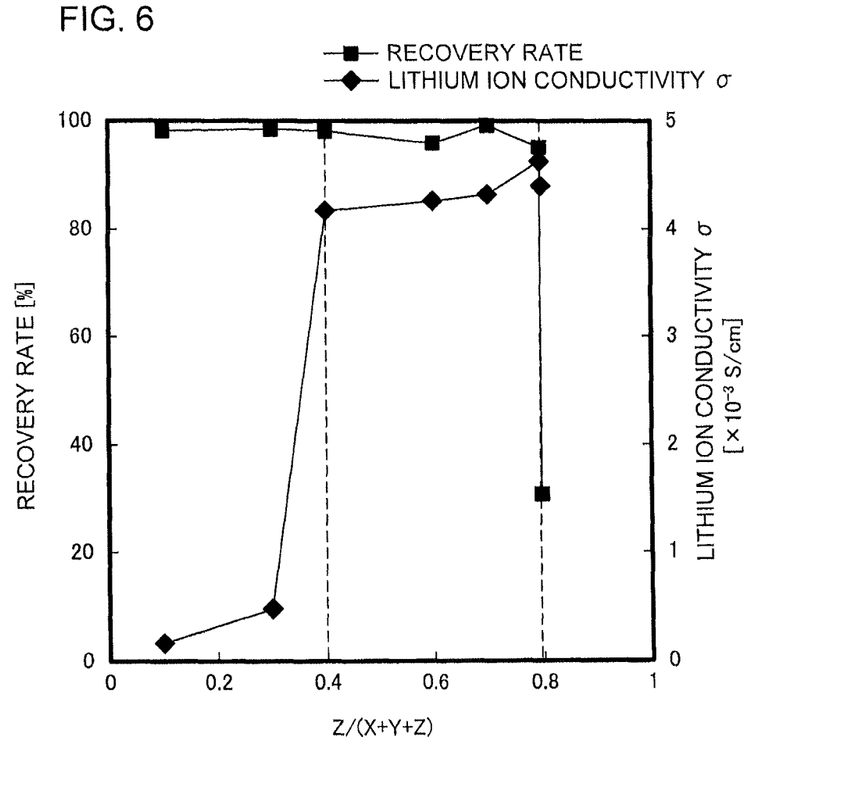
FIG. 6 is a diagram illustrating a relationship between the recovery rate, the lithium ion conductivity, and a proportion "Z/(X+Y+Z)" when two types of halides are contained.
Figure 7:
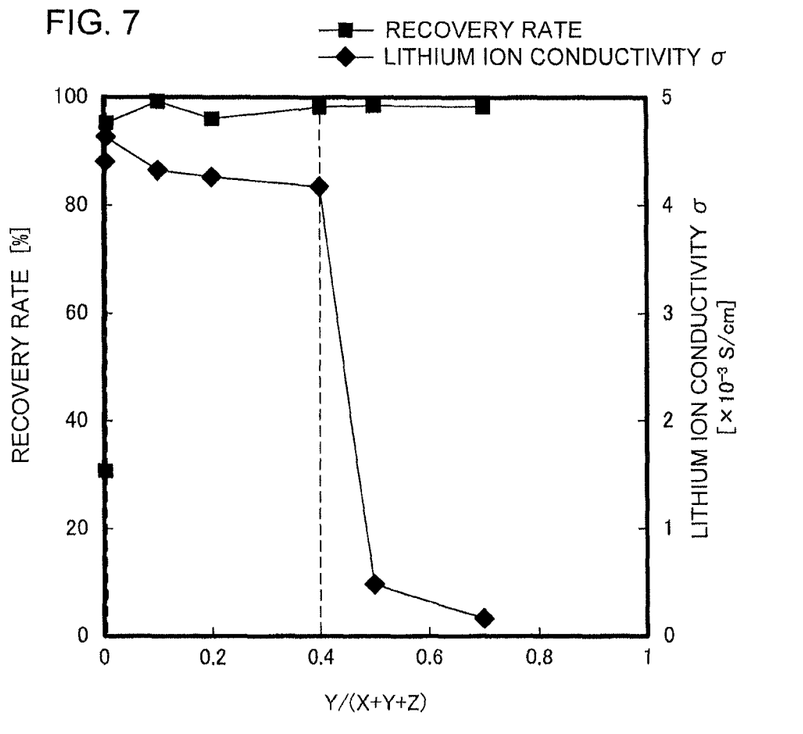
FIG. 7 is a diagram illustrating a relationship between the recovery rate, the lithium ion conductivity, and a proportion "Y/(X+Y+Z)" when two types of halides are contained.
Figure 8:
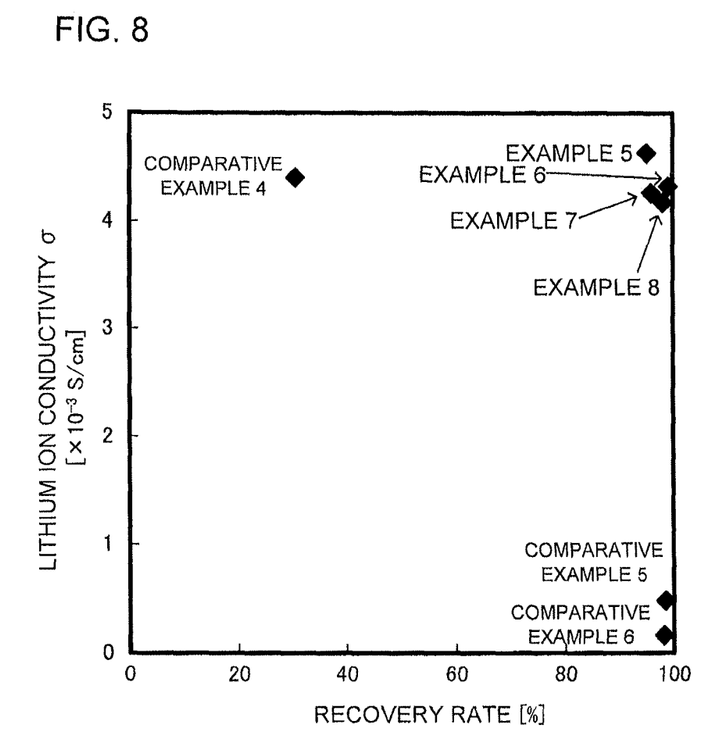
FIG. 8 is a diagram illustrating a relationship between the lithium ion conductivity and the recovery rate when two types of halides are contained.

For Examples 5 to 8 and Comparative Examples 4 to 6, a relationship between the recovery rate, the lithium ion

TABLE 3

|  | Recovery Rate [%] | Average Particle Diameter [μm] | LiBr Peak Intensity [counts] | LiI Peak Intensity [counts] | Lithium Ion Conductivity σ after Crystallization [×10⁻³ S/cm] |
| --- | --- | --- | --- | --- | --- |
| Example 1 | 98.3 | 0.9 | — | 110 | 2.54 |
| Example 2 | 98.6 | 4.6 | — | 221 | 2.61 |
| Example 3 | 99.0 | 0.7 | — | 351 | 2.41 |
| Example 4 | 96.3 | 0.19 | — | 450 | 2.43 |
| Example 5 | 95.2 | 1.7 | 15 | 154 | 4.63 |
| Example 6 | 99.2 | 1.2 | 21 | 49 | 4.32 |
| Example 7 | 96.0 | 0.4 | 36 | 111 | 4.26 |
| Example 8 | 98.2 | 1.9 | 63 | 92 | 4.17 |
| Comparative Example 1 | 20.3 | 0.68 | — | 120 | 2.57 |
| Comparative Example 2 | 97.3 | 0.4 | — | 1545 | 0.254 |
| Comparative Example 3 | 98.4 | 1.3 | — | 1615 | 0.243 |
| Comparative Example 4 | 30.7 | 8.9 | 20 | 209 | 4.4 |
| Comparative Example 5 | 98.5 | 1.7 | 32 | 659 | 0.38 |
| Comparative Example 6 | 98.2 | 0.2 | 313 | 1230 | 0.163 | conductivity, and the proportion "Z/(X+Y+Z)" of Table 2 is shown in FIG. 6, a relationship between the recovery rate, the lithium ion conductivity, and the proportion "Y/(X+Y+Z)" of Table 2 is shown in FIG. 7, and a relationship between the lithium ion conductivity and the recovery rate is shown in FIG. 8. In FIG. 6, the dotted lines plot "Z/(X+Y+Z)=0.40" and "Z/(X+Y+Z)=0.795." In FIG. 7, the dotted lines plot "Y/(X+Y+Z)=0.0050" and "Y/(X+Y+Z)=0.40."

As shown in Table 2 and FIGS. 6 to 8, it was recognized that the sulfide solid electrolytes of Examples 5 to 8 produced by using the method for producing sulfide solid electrolytes according to the present invention and satisfying the aforementioned formulas (i) and (ii) have high recovery rates and high lithium ion conductivities. In addition, in Examples 5 to 8, the compositional variations were insignificant, and the productivities of the sulfide solid electrolytes were high. In comparison, in the case of the sulfide solid electrolyte of Comparative Example 4 that does not satisfy the aforementioned formulas (i) and (ii), the lithium ion conductivity and the compositional variation were close to those of Examples 5 to 8, but the recovery rate was remarkably low. In the case of the sulfide solid electrolytes of Comparative Examples 5 and 6 that does not satisfy the aforementioned formula (ii), the recovery rate was close to those of Examples 5 to 8, but the compositional variation was significant, and the lithium ion conductivity was remarkably low.

Accordingly, using the method for producing sulfide solid electrolytes according to the present invention and satisfying the aforementioned formulas (i) and (ii), it was possible to produce sulfide solid electrolytes with the improved productivity, recovery rate, and ion conductivity.

The invention claimed is:

1. A method for producing a sulfide solid electrolyte, the method comprising the steps of:
    carrying out wet pulverization in which either
        a mixture of a sulfide solid electrolyte, an ether compound, and a solvent or
        a mixture of a raw material of the sulfide solid electrolyte, an ether compound, and a solvent is pulverized to obtain a pulverized product, wherein
            the sulfide solid electrolyte contains sulfides and a single type of halide, and
            the raw material contains sulfides and a single type of halide; and
    carrying out heat treatment wherein the obtained pulverized product is heated to obtain a crystallized sulfide solid electrolyte,
    wherein the following Formulas (1) and (2) are satisfied:

$$0.44 \leq C/(A+B+C) \leq 0.70 \qquad \text{Formula (1), and}$$

$$0.10 \leq B/(A+B+C) \leq 0.36 \qquad \text{Formula (2),}$$

where "A [g]" denotes a weight of the sulfide solid electrolyte or the raw material of the sulfide solid electrolyte, "B [g]" denotes a weight of the ether compound, and "C [g]" denotes a weight of the solvent.

2. The method according to claim 1, wherein
    a halogen of the single type of halide of the sulfide solid electrolyte is selected from the group consisting of F, Cl, Br, and I; and
    a halogen of the single type of halide of the raw material is selected from the group consisting of F, Cl, Br, and I.

3. A method for producing a sulfide solid electrolyte, the method comprising the steps of:
    carrying out wet pulverization in which either
        a mixture of a sulfide solid electrolyte, an ether compound, and a solvent or
        a mixture of a raw material of the sulfide solid electrolyte, an ether compound, and a solvent is pulverized to obtain a pulverized product, wherein
            the sulfide solid electrolyte contains sulfides and two types of halides, and
            the raw material contains sulfides and two types of halides; and
    carrying out heat treatment wherein the obtained pulverized product heated to obtain a crystallized sulfide solid electrolyte,
    wherein the following Formulas (i) and (ii) are satisfied:

$$0.40 \leq Z/(X+Y+Z) \leq 0.795 \qquad \text{Formula (i), and}$$

$$0.0050 \leq Y/(X+Y+Z) \leq 0.40 \qquad \text{Formula (ii),}$$

where "X [g]" denotes a weight of the sulfide solid electrolyte or the raw material of the sulfide solid electrolyte, "Y [g]" denotes a weight of the ether compound, and "Z [g]" denotes a weight of the solvent.

4. The method according to claim 3, wherein
    halogens of the two types of halides of the sulfide solid electrolyte are selected from the group consisting of F, Cl, Br, and I; and
    halogens of the two types of halides of the raw material are selected from the group consisting of F, Cl, Br, and I.

5. The method according to claim 1, wherein the sulfides comprise Li, "A," and S, where "A" denotes at least an element selected from the group consisting of P, Si, Ge, Al, and B.

6. The method according to claim 2, wherein the sulfides comprise Li, "A," and S, where "A" denotes at least an element selected from the group consisting of P, Si, Ge, Al, and B.

7. The method according to claim 3, wherein the sulfides comprise Li, "A," and S, where "A" denotes at least an element selected from the group consisting of P, Si, Ge, Al, and B.

8. The method according to claim 4, wherein the sulfides comprise Li, "A," and S, where "A" denotes at least an element selected from the group consisting of P, Si, Ge, Al, and B.

* * * * *